United States Patent [19]

Terano et al.

[11] Patent Number: 4,857,889

[45] Date of Patent: Aug. 15, 1989

[54] LIQUID-CRYSTAL INDICATOR CONTROL SYSTEM

[75] Inventors: Takashi Terano, Hiroshima; Masayuki Jinno, Higashihiroshima; Munetoshi Saijo, Hiroshima, all of Japan

[73] Assignee: Mazda Motor Corporation, Hiroshima, Japan

[21] Appl. No.: 226,710

[22] Filed: Aug. 1, 1988

[30] Foreign Application Priority Data

Aug. 3, 1987 [JP] Japan .............................. 62-119627

[51] Int. Cl.⁴ .............................................. B60Q 1/00
[52] U.S. Cl. ...................................... 340/461; 340/438; 340/449; 340/525
[58] Field of Search ................... 340/521, 52 R, 52 F, 340/52 S, 56, 765, 784, 588, 589; 307/10 R

[56] References Cited

U.S. PATENT DOCUMENTS 3,723,964  3/1973  Lace ................................. 340/52 F
4,770,543  9/1988  Burghoff et al. ................. 340/52 F
4,787,039  11/1988  Murata ........................... 340/52 F

FOREIGN PATENT DOCUMENTS 59-7477  1/1984  Japan .

Primary Examiner—Donnie L. Crosland
Attorney, Agent, or Firm—Fleit, Jacobson, Cohn, Price, Holman & Stern

[57] ABSTRACT

A liquid-crystal indicator control system for displaying at least two different informations alternatively at predetermined times that includes a temperature detector for detecting the ambient temperature relative to the liquid-crystal indicator. The ambient temperature is compared to a predetermined value and a signal is output when the temperature is less than the predetermined value. Display time is changed from a given predetermined time responsive to the signal indicative of ambient temperature being less than the predetermined value.

8 Claims, 7 Drawing Sheets

LIQUID-CRYSTAL INDICATOR CONTROL SYSTEM

FIELD OF THE INVENTION

The present invention relates to a system for displaying information on a liquid crystal indicator.

BACKGROUND OF THE INVENTION

As known, a liquid-crystal has optical aeolotropy and is used for an indicator. The liquid-crystal indicator can be driven with a low power consumption and can be designed compactly so that it can be utilized as an indicator in a vehicle. For example it can be used for a speedometer, clock or to display an abnormal indication. In a vehicle, plural indications are often indicated alternately at predetermined time intervals because of the limitation of display space.

The molecular structure of the liquid-crystal is not stronger than the crystal structure so that the molecular arrangement is rearranged or its coeffecient of viscosity is changed easily by an electric field, a magnetic field or temperature. Specifically, as shown in FIG. 8 the drawings, the response time of a liquid-crystal increases rapidly in accordance with temperature drops, because the viscosity of the liquid-crystal increases at low temperature. In FIG. 8, "RISE" shows a response time when voltage is applied to the liquid-crystal, and "DECAY" shows a response time when applied voltage to the liquid-crystal is stopped. If a vehicle, having a liquid-crystal indicator, is in a low temperature condition and plural indications are to be indicated alternately by the indicator at predetermined time intervals, two indications may overlap each other because of low response.

This problem is recognized in the Japanese Utility Model No. 101789182 issued on July 7, 1982 and a solution is offered. This solution applies a constant temperature control to a liquid-crystal indicator, however, this makes the volume of the indicator including the control quite large so that layout of the indicator in the vehicle is difficult and restricted.

SUMMARY OF THE INVENTION

Therefore, the object of the present invention is to provide a liquid-crystal indicator which is able to indicate information in plural indications alternately and correctly under low temperature conditions. The above and other objects of the present invention are accomplished by providing a liquid-crystal indicator which indicates information in plural indications alternately at predetermined time intervals. The liquid crystal indicator comprises temperature detecting means for detecting the ambient temperature relative to the indicator, and indicate period changing means for changing the predetermined time intervals when the temperature detected by the temperature detecting means is lower than a predetermined value.

DETAILED DESCRIPTION OF THE PREFERRED EMBODIMENT

Figure 1:
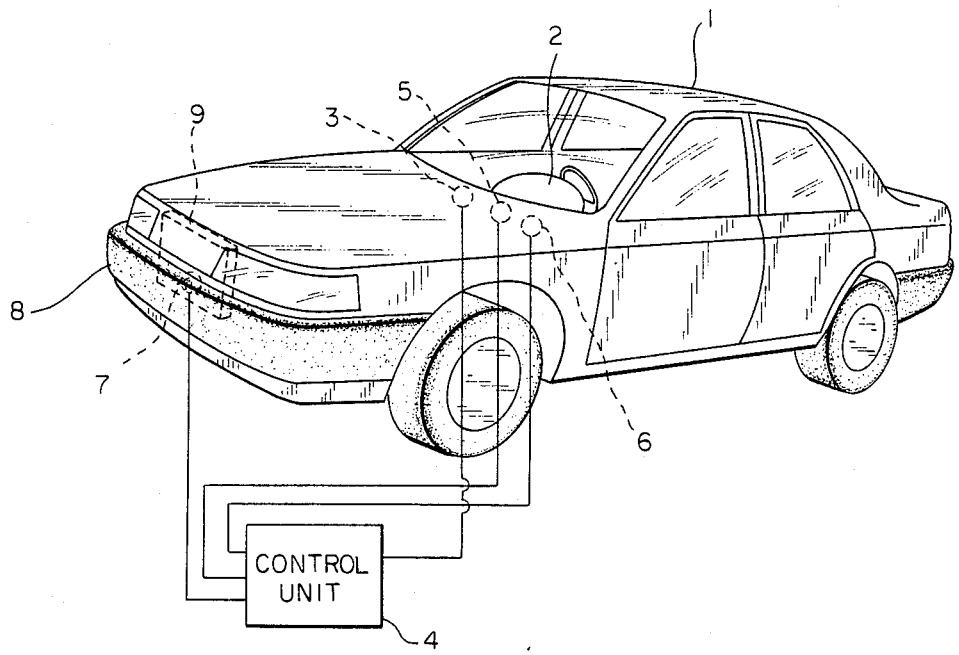
FIG. 1 is a schematic of a liquid-crystal indicator control system for a vehicle in accordance with the present invention.
Figure 2:
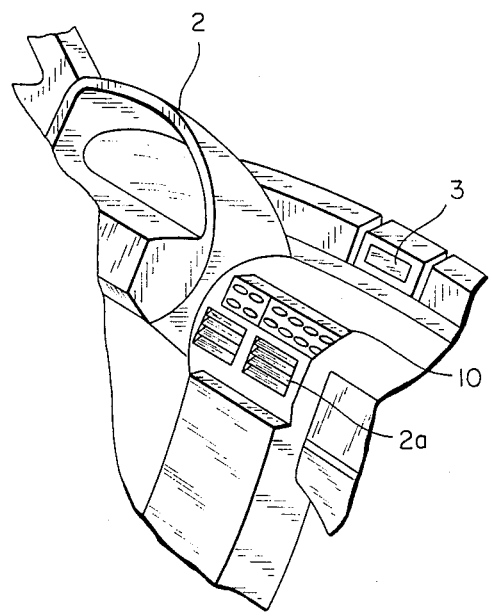
FIG. 2 shows a vehicle dashboard equipped with the system of the present invention.

Referring now to FIG. 1, a liquid-crystal indicator control system for a vehicle in accordance with the teachings of the present invention is shown. A liquid crystal indicator 3 is mounted on the instrument panel 2 of a vehicle 1. The liquid-crystal indicator 3 indicates information to the passengers in the vehicle. The liquid-crystal indicator 3 is controlled by signals from a control unit 4. The control unit 4 receives as inputs signals from an ignition switch 5, a vehicle speed sensor 6 and a temperature sensor 7. Ignition switch 5, temperature sensor 7 and vehicle speed sensor 6 are well-known devices. The temperature sensor 7 is mounted between a front bumper 8 and a radiator 9 of the vehicle 1 where air passes freely when the vehicle 1 is running to detect ambient temperature. FIG. 2 shows an instrument panel 2 equipped with the liquid-crystal indicator 3. The liquid-crystal indicator 3 is mounted in the middle of the instrument panel 2 where every passenger has good visibility to view it. Information in the form of plural indications, for example, average fuel consumption, instantaneous fuel consumption, drivable distance and external temperature are alternately indicated selectively on the indicator 3.

A selector box 10 for selecting the information to be indicated on the indicator 3 is mounted on the instrument panel 2 above an air vent duct 2a. The selector box 10 includes a plurality of switches (not shown in detail). The control unit 4 is housed in the selector box 10.

Figure 3:
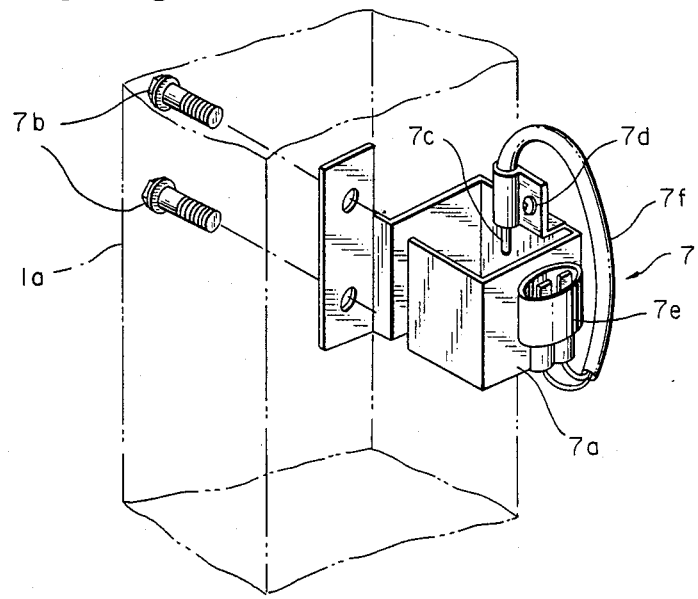
FIG. 3 shows a temperature sensor used in the present invention.

FIG. 3 shows the temperature sensor 7, which is composed of housing 7a mounted on a frame member 1a of the vehicle 1 by bolts 7b, a thermistor 7c fixed to the housing 7a by a clamp member 7d, and an electrical connector 7e fixed to the housing 7a by a fastener (not shown) and electrically connected to the thermistor 7d by cable or wire 7f.

Figure 4A:
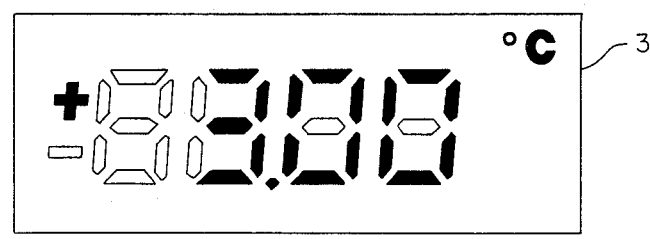
FIGS. 4a, 4b show display patterns of the liquid-crystal indicator in accordance with the present invention.
Figure 4B:
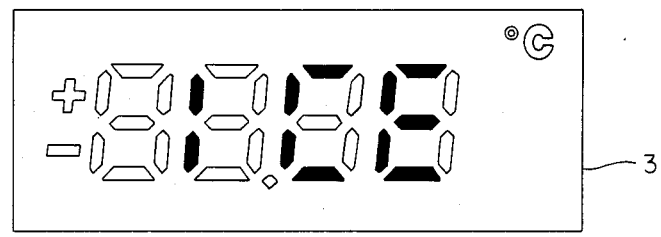

FIG. 4a and 4b shows, by way of example, display patterns of temperature on the liquid-crystal indicator 3. FIG. 4a shows a display pattern for numerically displaying outside air temperature t detected by the temperature sensor 7. FIG. 4b shows a display pattern for characteristically displaying a road condition temperature, for example, freezing or not, determined by outside air temperature t. In this embodiment, the characters "ICE" display a freezing condition.

Figure 5A:
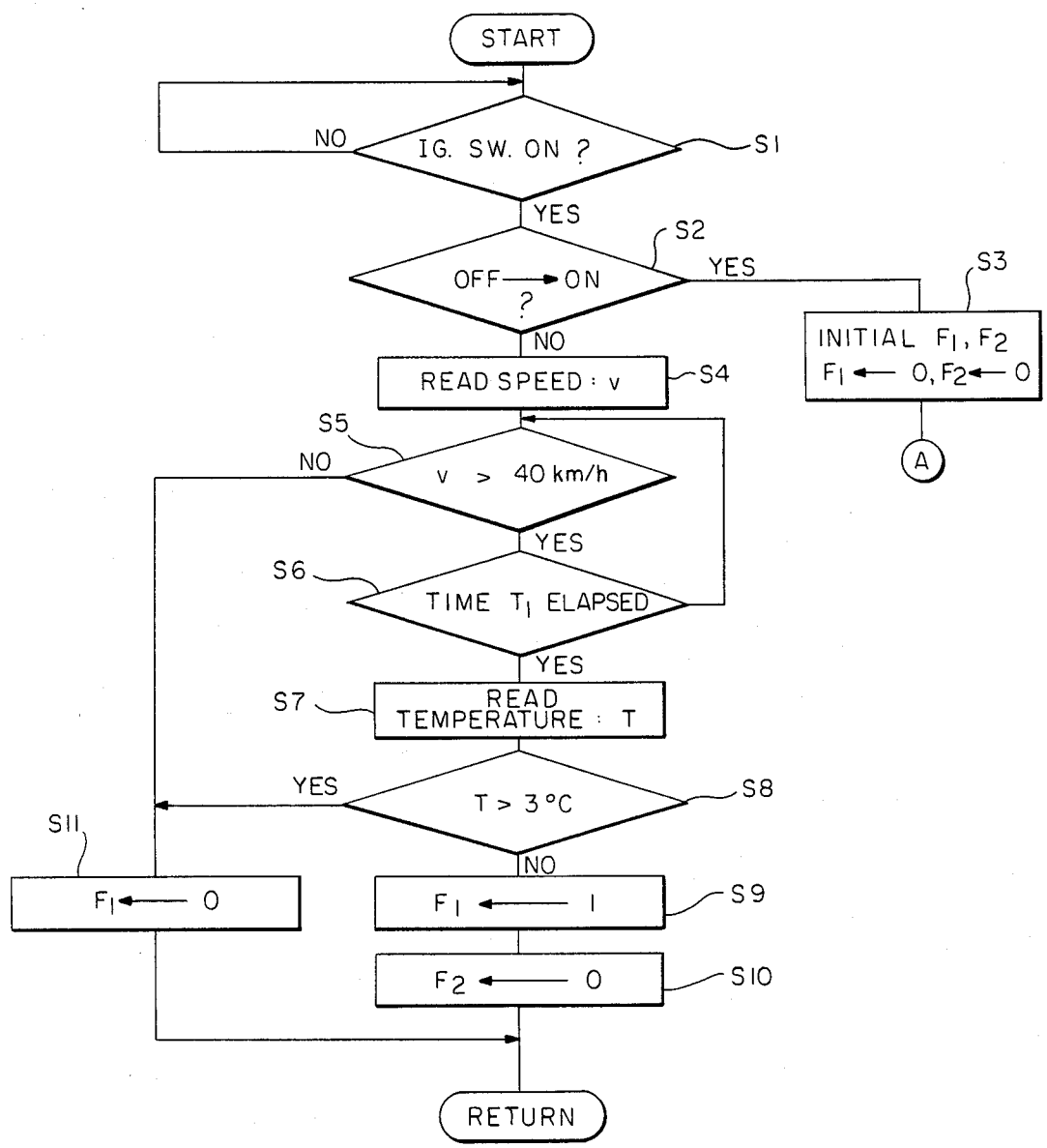
FIGS. 5a to 5c and FIG. 6, are flow charts illustrating examples of a liquid-crystal indicator control system in accordance with the present invention.
Figure 5B:
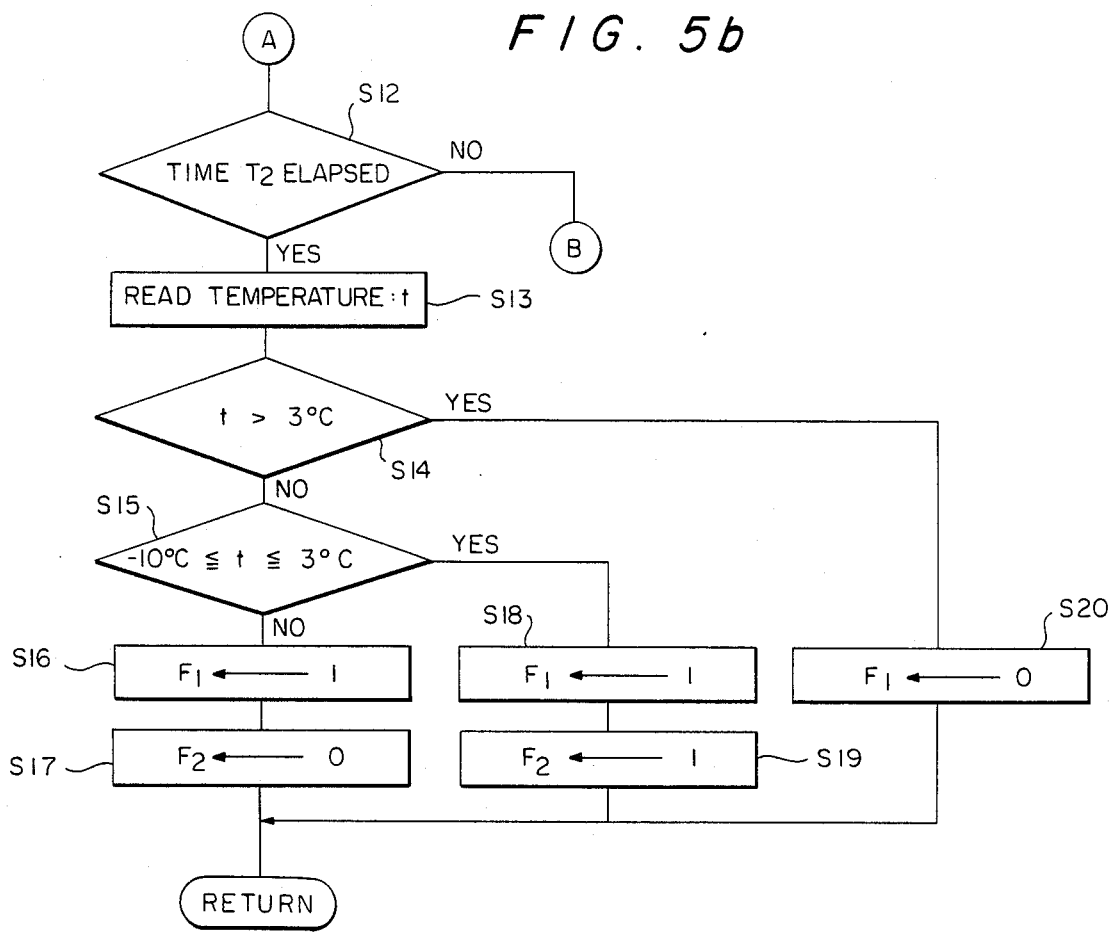
Figure 5C:
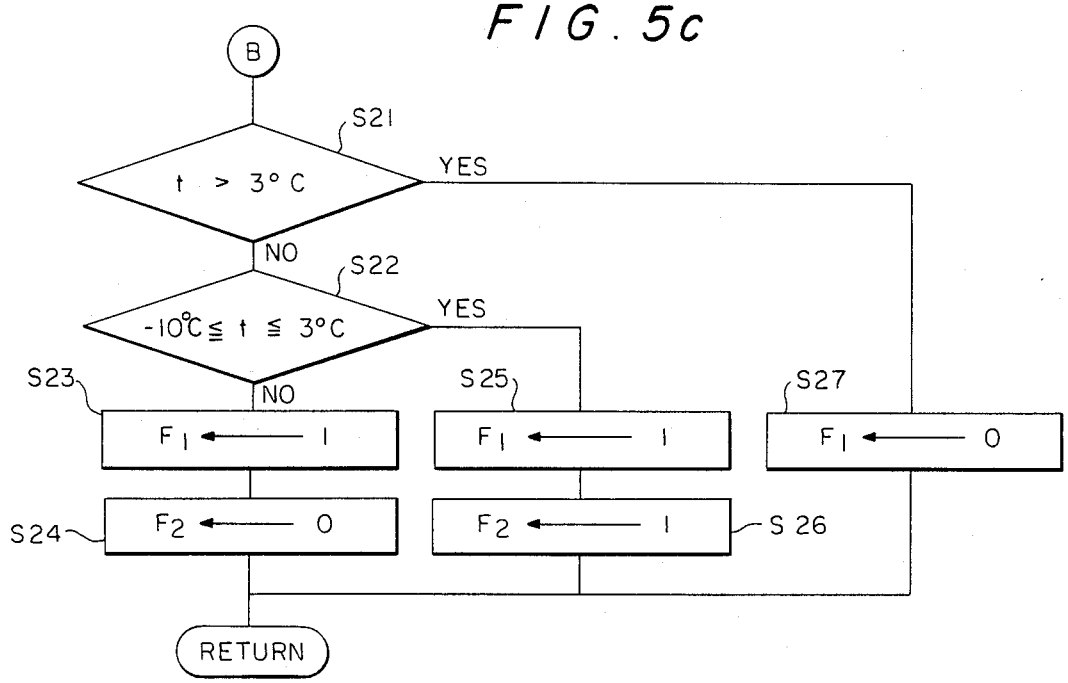
Figure 6:
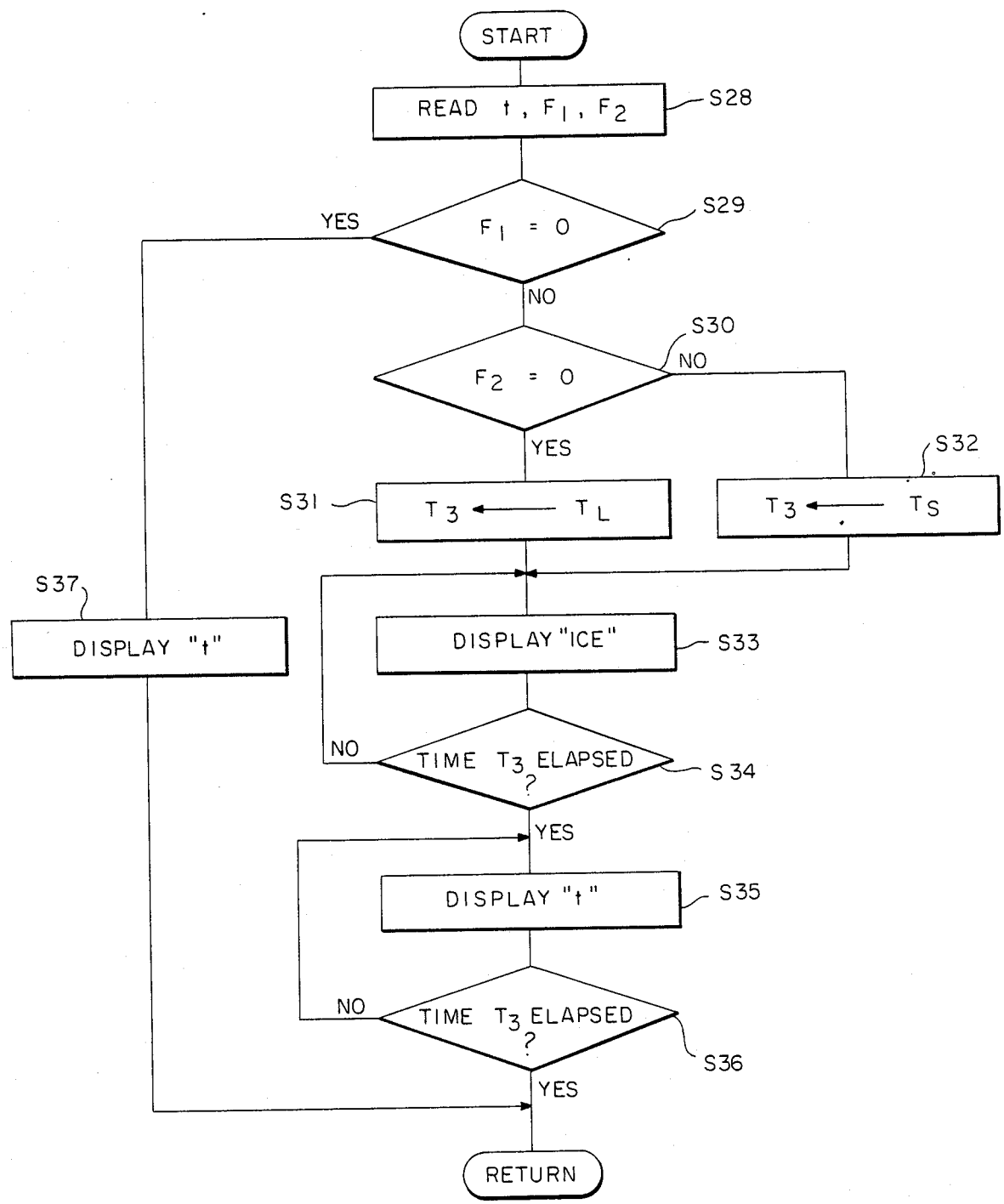

FIGS. 5 and 6 show flow charts for controlling the liquid-crystal indicator. In FIGS. 5 and 6, the letter "S" is used to show a logic step of the flow charts. First, logic step S1 determines the condition of ignition switch 5. If the ignition switch 5 is in ON condition, next logic step S2 determines whether the ignition switch 5 has bee changed to the ON condition from OFF or it is in the ON condition continuously. This logic step S2 is for detecting whether the vehicle has started to run just before or not. If the answer is yes, flags F1 and F2 are set "0" in logic step S3. If the answer is no, vehicle speed V is detected by the speed sensor 6 and read in logic step S4. The vehicle speed V is checked in logic step S5 to see if it is greater than 40 km/h. If the answer is yes, a timer T1 is set in a logic step Sf. If, during the period of time T1 the vehicle speed V is greater than 40 km/h continuously, outside air temperature t is read in logic step S7. If the answer is no in logic step S5, flag F1 is set "0" in logic step S11. THe outside air temperature t is checked in logic step S8 to see it it is higher than 3°. If the answer is no, Flag F1 is set "1" in logic step S9.

In FIG. 5b, logic step S12 inquires whether the OFF condition has been continued more than time $T_2$ (in this embodiment $T_2 = 5$ hours). If the answer is yes, outside air temperature t is read in logic step S13. Outside air temperature t is checked in logic step S14 to see if it is greater than 3° C. If the answer is no, the outside air temperature is checked in logic step S15 to see if it is $-10°$ C$\leq$ to $\leq 3°$ C. In logic step S14, if the answer is yes, the flag F1 is set "0" in logic step S20. If the answer is no, in logic step S15, flag F1 is set "1" in logic step S16 and flag F2 is set "0" in logic step S17. If the answer is yes in logic step S15, flag F1 is set "1" n logic step S18 anf flag F2 is set "1" in logic step S19.

If the answer is no in logic step S12, the outside air temperature t, which is memorized in the control unit 4, is checked in logic step S21 (FIG. 5c) to see if it is greater than 3° C. If the answer is no, the outside temperature t is checked in logic step S22 to see if the temperature is $-10°$ C.$\leq$to$\leq 3°$ C. If the answer is yes in logic step S21, flag F1 is set "0" in logic step S27. If the answer is no in logic step S22, flag F1 is set "1" in logic step S23 and flag F2 is set "0" in logic step S24. If the answer is yes in logic step S22, flag F1 is set "1" in logic step S25 and flag F2 is set "1" in logic step S26.

FIG. 6 shows the logic steps for selecting the display patterns displayed on the indicator and determining the time intervals for alternately changing the display patterns. These logic steps proceed parallel to the logic step as shown in FIGS. 5a to 5c. The data of the outside air temperature t and flags F1, F2, which are determined in the logic steps as shown in FIGS. 5a to 5c, are read in logic step S28. Logic step S29 inquires if flag F1 is "0". If the answer is yes, the outside air temperature t is displayed numerically by the display pattern shown in FIG. 4a. If the answer is no, next logic step S30 inquires if flag F2 is "0". If the answer is yes, timer $T_3$ is set to time $T_L$ in logic step S31. If the answer is no, the timer $T_3$ is set to time $T_s$ in logic step S32. Here, time $T_L$ is longer than time $T_s$ (for example $T_s$ is set to 1 sec and $T_L$ is set to 5 sec). In logic steps S33 and S34, a character "ICE" is displayed on the indicator for the predetermined time $T_3$. In next logic steps S35 and S36, the outside air temperature t is displayed numerically for a predetermined time $T_3$. In these logic steps, the two display patterns are displayed alternatively at proper time intervals according to the outside air temperature t.

Figure 7:
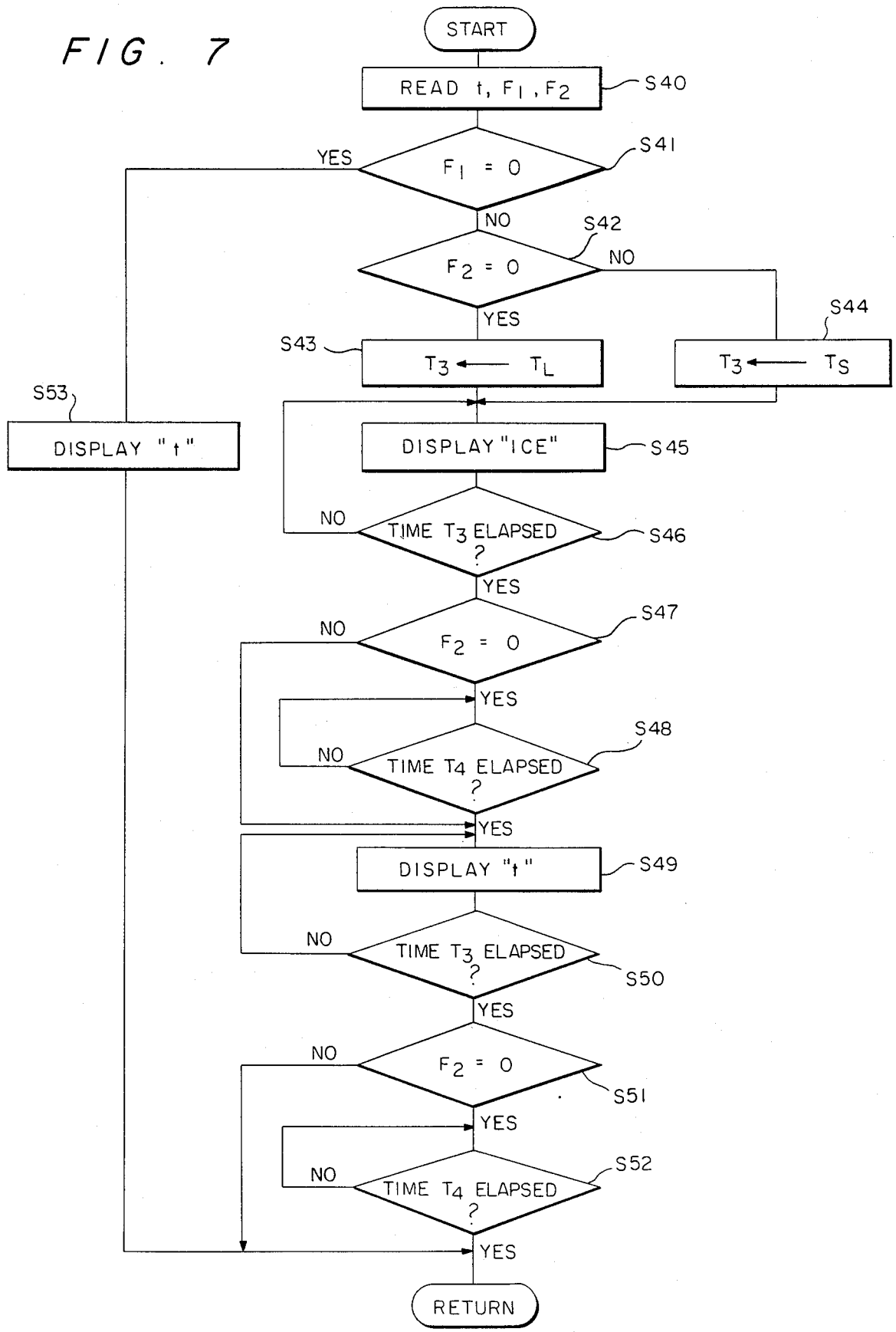
FIG. 7 shows a flow chart for another embodiment of the present invention.
Figure 8:
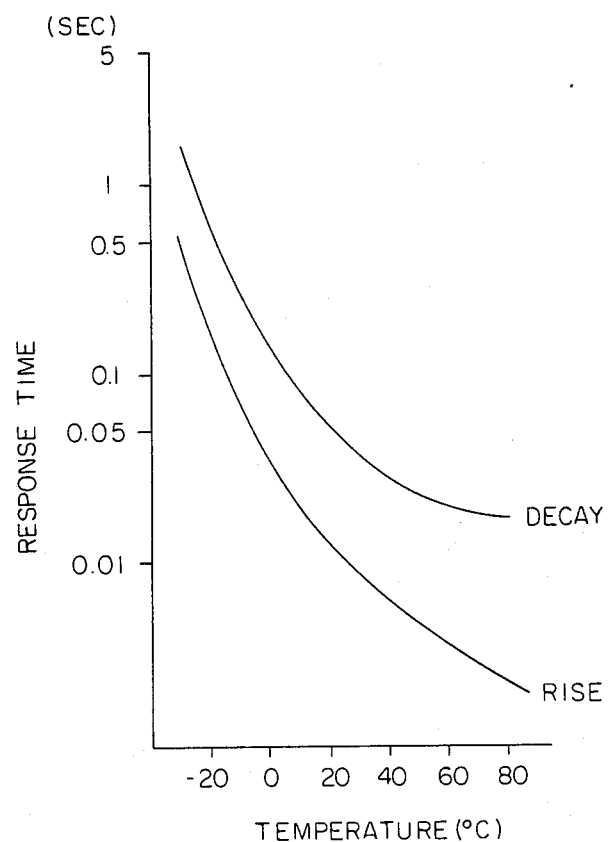
FIG. 8 is graph illustrating characteristics of a liquid-crystal.

FIG. 7 shows a flow chart for another embodiment of the present invention. the logic steps select the display patterns displayed on the indicator 3 and determine the time intervals for alternately changing the display patterns. As before these logic steps proceed in parallel with the logic steps shown in FIGS. 5a to 5c. The data of the outside air temperature t and flags F1, F2 which are determined in logic steps shown in FIGS. 5a to 5c, are read in logic step S40. Logic step S41 inquires if flag F1 is "0". If the answer is yes, the outside air temperature t is displayed numerically by the display pattern shown in FIG. 4a. If the answer is no, next logic step S42 inquires if flag F2 is "0". If the answer is yes, timer $T_3$ is set to time $T_L$. If the answer is no, the timer $T_3$ is set to $T_s$. Here, time $T_L$ is longer than time $T_s$ (for example, $T_s$ is set to 1 sec and $T_L$ is set to 5 sec).

In logic steps S45, S46, a character "ICE" is displayed on the indicator for the predetermined time $T_3$. Next logic step S47 inquires if flag F2 is "0". If the answer is yes, next logic step S48 inquires whether a predetermined time $T_4$ (for example, $T_4 = 0.5 - 1$ sec) has elapsed or not. This timer $T_4$ is for indicating the display pattern "ICE" perfectly. If the answer is no in logic step S47, or the answer is yes in logic step S48, outside air temperature t is displayed numerically for the predetermined time $T_3$ in logic steps S49 and S50. If the answer is no in logic step S48, logic step S48 is repeated until the answer is yes. Next logic step S51 inquires if flag F2 is "0". If the answer is yes, next logic step S52 inquires whether a predetermined time $T_4$ (for example $T_4 = 0.5 - 1$ sec) has elapsed or not. This time $T_4$ is provided for the same object as logic step S48. In these logic steps, two display patterns are displayed alternatively at proper time intervals without any overlap of the display patterns.

Changes in the preferred embodiments described herein which do not differ in substance from the teachings herein are deemed to fall within the purview of the present invention as claimed.

We claim:

1. A vehicle having a liquid-crystal indicator control system for display of at least two different information alternatively, for predetermined times comprising;
   (a) a vehicle
   (b) a liquid-crystal indicator for mounting in said vehicle, and
   (c) a control system therefore comprising
      (i) a temperature detecting means for detecting ambient temperature relative to said liquid-crystal indicator,
      (ii) a comparator means for comparing said detected ambient temperature with a predetermined temperature value,
      (iii) output means for outputing a signal when said detected ambient temperature is less than said predetermined temperature, and
      (iv) display time changing means for changing the predetermined time of display responsive to said output signal.

2. A liquid-crystal indicator control system as defined in claim 1, wherein said indicator is mounted in the vehicle to be viewed by passengers riding in the vehicle.

3. A liquid-crystal indicator control system as defined in claim 2, wherein said temperature detecting means is mounted in the front of said vehicle.

4. A liquid-crystal indicator control system as defined in claim 3, wherein numerical data indicative of said temperature and a character showing a road condition determined by said temperature are displayed alternatively on said liquid-crystal indicator.

5. A liquid-crystal indicator control system as defined in claim 4, wherein said display time changing means is actuated just after the vehicle engine is started.

6. A liquid-crystal indicator, control system as defined in claim 4, wherein said display time changing means is not actuated until a predetermined period lapses after the vehicle engine is started.

7. A liquid-crystal indicator control system as defined in claim 3, further comprising a vehicle detecting means for detecting the speed of the vehicle and means for blocking the comparison of the ambient temperature and the predetermined temperature value until said vehicle speed is greater than a predetermined value.

8. A liquid-crystal indicator control system as defined in claim 3, wherein numerical date indicative of said temperature and a character showing a road condition determined by said temperature are displayed alternatively for predetermined times on said liquid-crystal indicator when said temperature is less than a first predetermined value, and said predetermined time is set shorter when said temperature is less than a second predetermined value which is smaller than said first predetermined value.

* * * * *